United States Patent
Fridental et al.

(10) Patent No.: US 10,229,322 B2
(45) Date of Patent: Mar. 12, 2019

(54) APPARATUS, METHODS AND COMPUTER PRODUCTS FOR VIDEO ANALYTICS

(71) Applicant: ANTS TECHNOLOGY (HK) LIMITED, Hong Kong (HK)

(72) Inventors: Ron Fridental, Shoham (IL); Ilya Blayvas, Rehovot (IL)

(73) Assignee: ANTS TECHNOLOGY (HK) LIMITED, Hong Kong (HK)

(*) Notice: Subject to any disclaimer, the term of this patent is extended or adjusted under 35 U.S.C. 154(b) by 63 days.

(21) Appl. No.: 15/480,709

(22) Filed: Apr. 6, 2017

(65) Prior Publication Data
US 2018/0293442 A1 Oct. 11, 2018

(51) Int. Cl.
*G06K 9/00* (2006.01)
*G06F 17/30* (2006.01)

(52) U.S. Cl.
CPC ..... *G06K 9/00718* (2013.01); *G06F 17/3079* (2013.01); *G06F 17/30259* (2013.01); *G06K 9/00765* (2013.01)

(58) Field of Classification Search
CPC ........... G06K 9/00718; G06K 9/00765; G06K 9/00771; G06K 9/6215; G06K 9/6255; G06K 9/66; G06K 9/6263; G06K 9/00201; G06K 9/00248; G06K 9/00255; G06K 9/00261; G06K 9/00281; G06K 9/00295; G06K 9/00369; G06K 9/00711; G06K 9/00744; G06K 9/00778; G06K 2009/00738; G06K 2209/25;
(Continued)

(56) References Cited

U.S. PATENT DOCUMENTS 6,006,039 A 12/1999 Steinberg et al.
6,970,189 B1 11/2005 Bernstein et al.
(Continued)

FOREIGN PATENT DOCUMENTS

EP 3073726 A1 9/2016

OTHER PUBLICATIONS

FLIR's FC-series installation manual—Http://flir.com/uploadedfiles/CVS_Americas/Security_-_NEW/Products/FC-Series/FLIR-FC-Series-S-Installation-Manual.pdf , Mar. 2017.
(Continued)

*Primary Examiner* — Jose L Couso
(74) *Attorney, Agent, or Firm* — Soroker Agmon Nordman (57) ABSTRACT

A computerized method for providing no-configuration object recognition video analytics, the method comprising generating a database stored in computer memory and including labelled images of recognized objects imaged at an initial set of sites including at least one site; using the database as a training set to train a pattern recognition engine; uploading images of additional site/s including at least one additional site which is not a member in the initial set of sites; providing object recognition results for the additional site/s by using the pattern recognition engine on the images as uploaded; verifying the object recognition results; and using a processor for operating the pattern recognition engine on images generated at each the additional site/s including modifying the pattern recognition engine according to and when indicated by the verifying, thereby to provide no-configuration object recognition video analytics at the additional site/s.

13 Claims, 3 Drawing Sheets

(58) Field of Classification Search
CPC ..... G06K 2209/27; G06T 7/0002; G06T 7/13; G06T 7/20; G06T 7/30; G06T 7/60; G06T 7/70; G06T 7/80; G06T 7/11; G06T 7/246; G06T 7/292; G06T 2207/10016; G06T 2207/30168; G06T 2207/30196; G06T 2207/30232; G06T 2207/30201; G06T 2207/20036; G06T 2207/30242; G06T 2207/30244; H04N 7/181; H04N 7/183; H04N 21/23418; H04N 21/23424; H04N 21/23439; H04N 21/23608; H04N 21/44; H04N 21/466; H04N 21/812; H04N 21/8456; G08G 13/19645; G08G 13/1968; G08G 13/19615; G08G 13/19602; G08G 13/19608; G06F 17/28; G06F 17/3028; G06F 17/30259; G06F 17/30268; G06F 17/3079; G06N 99/005; G06Q 30/0268; G06Q 30/0271; G07F 19/207; G10L 15/265; H04L 65/60
See application file for complete search history.

(56) References Cited

U.S. PATENT DOCUMENTS

| | | | |
|---|---|---|---|
| 8,115,819 | B2 | 2/2012 | Anderson et al. |
| 9,025,007 | B1 | 5/2015 | Parsons et al. |
| 9,049,348 | B1 * | 6/2015 | Foster ................... H04N 7/181 |
| 9,282,296 | B2 * | 3/2016 | Gao ....................... H04N 7/181 |
| 10,115,203 | B2 * | 10/2018 | Givon ..................... G06T 7/20 |
| 2010/0201815 | A1 * | 8/2010 | Anderson .......... G06K 9/00771 |
| | | | 348/148 |
| 2012/0079406 | A1 | 3/2012 | Medhurst et al. |
| 2014/0015984 | A1 * | 1/2014 | Seow .................... H04N 17/002 |
| | | | 348/187 |
| 2014/0063237 | A1 * | 3/2014 | Stone ..................... H04N 7/181 |
| | | | 348/143 |
| 2014/0146187 | A1 | 5/2014 | Ju et al. |
| 2014/0152848 | A1 | 6/2014 | Cox |
| 2014/0300758 | A1 * | 10/2014 | Tran ....................... H04N 5/225 |
| | | | 348/207.1 |
| 2015/0082203 | A1 * | 3/2015 | James ............... H04N 21/23418 |
| | | | 715/756 |
| 2015/0381948 | A1 * | 12/2015 | Renkis ................... H04N 7/181 |
| | | | 348/47 |
| 2017/0154426 | A1 * | 6/2017 | Cheng .................. G06K 9/6215 |
| 2017/0270674 | A1 * | 9/2017 | Shrivastava ....... G06K 9/00771 |
| 2017/0270689 | A1 * | 9/2017 | Messely .................. G06T 7/80 |
| 2018/0047171 | A1 * | 2/2018 | Chen ....................... G06T 7/20 |
| 2018/0129892 | A1 * | 5/2018 | Bahl .................. G06K 9/00979 |
| 2018/0157939 | A1 * | 6/2018 | Butt ......................... G06K 9/66 |
| 2018/0285767 | A1 * | 10/2018 | Chew ................... G06N 99/005 |

OTHER PUBLICATIONS

Long, J., Shelhamer, E., & Darrell, T. (2015). Fully convolutional networks for semantic segmentation. In Proceedings of the IEEE conference on computer vision and pattern recognition (pp. 3431-3440).

Multiple View Geometry, Richard Hartley and Andrew Zisserman, Cambridge University Press 2004.

* cited by examiner

APPARATUS, METHODS AND COMPUTER PRODUCTS FOR VIDEO ANALYTICS

REFERENCE TO CO-PENDING APPLICATIONS

No priority is claimed.

FIELD OF THIS DISCLOSURE

The present invention relates generally to computerized systems and more particularly to computerized systems for video analytics.

BACKGROUND FOR THIS DISCLOSURE

FLIR's FC-series installation manual, available on-line at the following link: Http://flir.com/uploadedfiles/CVS_Americas/Security_-_NEW/Products/FC-Series/FLIR-FC-Series-S-Installation-Manual.pdf instructs, on page 3-6, that:

"To set the Human Size properties, have a person walk around at the bottom of the area and adjust the Human Size Near Width and Near Height parameters so the blue box (near human) is the same size as the yellow detection box. Click Save. Then, have the person walk around at the top of the area and adjust the Human Size Far Width and Far Height parameters so the purple box (far human) is the same size as the yellow detection box around them. Click Save. The yellow detection box will change to orange when it fits between the minimum (far human) and maximum (near human) bounding boxes. Set the Human Size Tolerance to allow for expected variations in the detected person size. A tolerance of 10% will cause the Near bounding box to increase by 10% and the Far bounding box to decrease by 10%. The tolerance is set independently for Human Size and Vehicle Size. Repeat this same exercise using an appropriate vehicle to determine the Vehicle Size parameters. Finally, set the Vehicle Size Tolerance to allow for expected variations in the detected vehicle size. A tolerance of 10% will cause the Near bounding box to increase by 10% and the Far bounding box to decrease by 10%. The tolerance is set independently for Human Size and Vehicle Size.'

U.S. Pat. No. 9,282,296 to Gao describes a method for determining relationships between cameras: "In act 62 of FIG. 2, any relationship of a camera with one or more other cameras is received. The processor receives the interrelationship information in response to input from the user. The user indicates whether and/or how the cameras are related. The relationship may be for field of view overlap, for viewing a same location, or for being connected by traffic flow. For example, an exit/entry point (e.g., transition point) in one field of view may lead to a hallway with an exit/entry point at another end in a field of view of the other camera. The cameras are related such that traffic from one progresses to the other even though the fields of view do not overlap . . . .

Hotspots define valid places (e.g., hallways or doors) that a person could enter or leave the view . . . .

One or more hotspots are defined. The hotspots are locations associated with the video analytics. In one example, the hotspots are entry and exit locations of the field of view of the camera. In other examples, the hotspot is additionally or alternatively a location where a person, license plate, or other distinguishing feature is more likely viewable by the camera. Other hotspots depending on the type of analytics performed may be used. The hotspots are entered on the image, but may be alternatively designated on the map. The user defines the hotspot using the paint tool . . . . One or more hotspots are automatically generated . . . . Tracking moving objects may be used to automatically detect hotspots. The locations, such as foot locations, at which people appear or disappear in a field of view or scene from a camera are detected. The density of these occurrences may indicate a hotspot."

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Prior art video analytic systems typically are installed in a process which includes so-called "configuration" of the video analytic system's camera. For example, U.S. Pat. No. 9,282,296 to Gao points out that "An experienced worker may need about eight minutes to configure a camera, during which the worker may click the mouse buttons more than 100 times". This process is so laborious as to sometimes be more costly than the total cost of the video analytic system hardware in its entirety. This process means that the end user cannot be expected to install on a do-it-yourself basis, and even visiting technicians need to be extensively trained so they will become suitably "experienced". In particular, the environment to be detected is typically imaged in advance i.e. specially for the configuration process, and the system, accordingly, is trained for its detection tasks, in advance.

Certain embodiments seek to provide a self-configuring visual assistance system. Certain embodiments seek to simplify installation of video analytics systems in view of the fact that exceptionally demanding video analytics configuration processes, as typified by the examples in the Background section, make installation unacceptably complex for many if not all potential end-users.

Certain embodiments seek to provide a video analytics system characterized by object recognition functionality which requires little or no configuration upon installation, by using labelled objects from a first site to train a semantic segmentation engine (or object recognition engine or object detector), using that engine at a second site and improving the engine's object recognition functionality for the second site specifically, using a typically off-site, typically manual process for verifying the engine's performance and, accordingly, modifying the engine.

Certain embodiments seek to provide an improved method for configuring a video analytics system including using an image data repository for training of a pattern recognition engine, such as but not limited to semantic segmentation, object detection, object recognition.

Certain embodiments seek to provide automatic recognition of mutual configuration and geometric relationship between cameras, via identification of the objects observed by more than one of the cameras, and deriving spatial relationships between cameras by comparing images of the object as imaged by the various cameras. Certain embodiments seek, e.g. based on automatic recognition as above, to classify the type of environment, and to select and/or configure or parameterize at least one video analytics application suitable for the detected environment.

Certain embodiments seek to provide self-configuring visual assistance systems including video analytics operative for automatically configuring the systems e.g. to recognize suspicious or emergency occurrences, including combining data from one some or all of the following sources:

a. Recognition of objects/items in the image,
   b. Listening to the sounds,
   c. Analyzing location (from wireless for example, or by GPS)
   d. Gathering information related to the user, from phone APP connected to the device,
   and/or using rules to mask an area for future video analytics and/or modifying rules e.g. by initiating dialog with user and modifying at least one rule responsive to the dialogue.

The following terms may be construed either in accordance with any definition thereof appearing in the prior art literature or in accordance with the specification, or as follows:

Convolutional Neural Networks: such as but not limited to those described in [Long 2015] Fully Convolutional Networks for Semantic Segmentation. Jonathan Long*Evan Shelhamer*Trevor Darrell; CVPR 2015.

Video Analytics: Intended to include any variety of Video analytics or Video content analysis or Video content analytics aka VCA, including automatically analyzing video to detect and/or classify temporal and spatial events.

Video Analytics Application: intended to include a specific task or set of tasks suited to certain use cases e.g. a security surveillance application as opposed to a retail store management application.

Video analytics systems: intended to include any video systems surveying an environment or scene or site using video cameras and optionally other sensors, and processing, locally or on a cloud, acquired video and sensory information e.g. for the sake of extracting information and/or detecting events and/or performing tasks and/or triggering alarms.

Pattern recognition engine: intended to include engine operative for semantic segmentation of videoed image/s and/or recognition or detection of objects within the videoed image/s.

Functional validation: intended to include any detection and/or tracking of semantically segmented images and/or of recognized objects to verify (or not) that each segment and/or recognized object is being used as expected e.g. by the semantic meaning of the label and/or by prior knowledge regarding that segment or object as labelled or identified. If an object or segment are found not to behave as expected, suitable action may be taken as described herein; the label of the object or segment may be changed and/or the engine which performed the object detection and/or object recognition and/or semantic segmentation may be tuned.

Thus the present invention typically includes at least the following embodiments:

Embodiment 1

A computerized method for providing no-configuration object recognition video analytics, the method comprising:
generating a database stored in computer memory and including labelled images of recognized objects imaged at an initial set of sites including at least one site;
using the database as a training set to train a pattern recognition engine e.g. semantic segmentation engine;
uploading images of additional site/s including at least one additional site which is not a member in the initial set of sites;
providing object recognition results for the additional site/s by using the semantic segmentation engine on the images as uploaded;
verifying the object recognition results; and
using a processor for operating the pattern recognition engine e.g. semantic segmentation engine on images generated at each of the additional site/s including modifying the semantic segmentation engine according to and when indicated by the verifying, thereby to provide no-configuration object recognition video analytics at the additional site/s.

Embodiment 2

A method according to any of the preceding embodiments wherein the verifying is performed remotely from the additional site/s.

Embodiment 3

A method according to any of the preceding embodiments wherein the verifying comprises presenting the object recognition results to a human and accepting a verifying input provided by the human.

Embodiment 4

A method according to any of the preceding embodiments wherein the accepting comprises displaying 2 selectable options to the human, corresponding to "object" and "not object" and accepting the human's selection of one of the two options.

Embodiment 5

A computerized system for providing no-configuration object recognition video analytics, the system comprising:
a user interface for accepting uploaded images of additional site/s including at least one additional site which is not a member in the initial set of sites; and
a processor configured for providing object recognition results for the additional site/s by using a pattern recognition engine e.g. semantic segmentation engine on the images as uploaded; verifying the object recognition results;
operating the pattern recognition engine e.g. semantic segmentation engine on images generated at each of the additional site/s including modifying the pattern recognition engine e.g. semantic segmentation engine according to and when indicated by the verifying, thereby to provide no-configuration object recognition video analytics at the additional site/s.

Embodiment 6

A system according to any of the preceding embodiments and also comprising a semantic segmentation engine in data communication with the processor.

Embodiment 7

A system according to any of the preceding embodiments and also comprising:
a database including labelled images of objects recognized at an initial set of sites including at least one site; and
a processor configured for using the database as a training set to train a semantic segmentation engine.

Embodiment 8

A computer program product, comprising a non-transitory tangible computer readable medium having computer readable program code embodied therein, the computer readable program code adapted to be executed to implement a computerized method for providing no-configuration object recognition video analytics, the method comprising:

generating a database stored in computer memory and including labelled images of recognized objects imaged at an initial set of sites including at least one site;

using the database as a training set to train a pattern recognition engine e.g. semantic segmentation engine;

uploading images of additional site/s including at least one additional site which is not a member in the initial set of sites;

providing object recognition results for the additional site/s by using the pattern recognition engine e.g. semantic segmentation engine on the images as uploaded;

verifying the object recognition results; and using a processor for operating the pattern recognition engine e.g. semantic segmentation engine on images generated at each of the additional site/s including modifying the semantic segmentation engine according to and when indicated by the verifying, thereby to provide no-configuration object recognition video analytics at the additional site/s.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, Blurays, magnetic-optical discs or other discs; RAMS, ROMS, EPROMs, EEPROMs, magnetic or optical or other cards, for storing, and keyboard or mouse for accepting. Modules shown and described herein may include any one or combination or plurality of: a server, a data processor, a memory/ computer storage, a communication interface, and a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. Digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

It is appreciated that the various functionalities, modules, subsystems described herein, may be firmware-implemented or processor-implemented.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line, which is of any type or level or amount or category of volatility, differentiation, mutability, accessibility, addressability, capacity, performance and energy use, and which is based on any suitable technologies such as semiconductor, magnetic, optical, paper and others.

DETAILED DESCRIPTION OF CERTAIN EMBODIMENTS

Certain embodiments seek to provide a semantic segmentation based, automatic-configuration option either for legacy cameras, or for cameras newly installed, in an environment. "Semantic segmentation" is intended to include methods for partitioning at least a portion of an image into "segments" (e.g. single pixels in the case of pixelwise classification, or pixel sets) and assigns a semantic label, indicating one of plural semantic classes, to each portion, thereby typically to yield semantic understanding of each pixel in the image.

For example, labelled images taken from one or more small store environments may be used to train a pattern recognition engine e.g. semantic segmentation engine, for classes marked on the labels e.g. images of product shelves may be marked or labelled 'product shelves'.

Different stores have different shelf types and/or outlook. These segmented images may be used to train the network for semantic segmentation of a new site, even if they typically cannot be used 'as is' at the new site.

Typically the system and methods shown herein simplify or omit at least one of the following processes which, conventionally, are performed as part of the technician's "configuring" of the camera, e.g. when installing same hence prior to the video analytic system's operational stage:

A. Generating images of the environment, including manually performing the following: adjusting the camera's field of view plural times, and each time, semantically labelling the resulting image (either explicitly, or implicitly by imaging responsive to a system prompt to image x or y e.g. "please image the front door". This process is both time consuming, and requires experience and/or guidance regarding what exactly to mark-up, and how. According to certain embodiments, this is done automatically either locally or on the cloud; according to the latter embodiments, images of the environment are sent to servers, where they are marked by a trained neural network or by trained human operators.

B. Manual selection of image segments within which to detect objects such as "road area" for a tunnel monitoring system and "doors" and "windows" in an intruder detection system.

C. Semantic labelling of each segment manually selected in (b).

D. Manual selection of, and semantic labelling of, objects to be detected (which may then be used as a training set or other learning methodology) such as "car" for a tunnel monitoring system, "canned goods" or "cereal boxes" or "bottles" for a shoplifting detection system, etc.

E. Semantic labelling of each segment manually selected in (d).

F. Search in the menu for the operations within each area. For example, each object may be marked by a polygon, yielding, typically, dozens of points. If for example, 5 different objects/areas are marked by polygons of 20 points each, this necessitates 100 clicks. More clicks are required if some points need to be corrected/moved.

In contrast, the video analytic system shown and described herein typically is operative for self-configuration, and/or typically provides a user-selectable self-configuration option, which includes some or all of the following operations suitably ordered e.g. as follows:

Operation 1. Segmented images of the training database are uploaded from predecessor video analytic systems installed in the same environment. For example, John buys and installs a new surveillance system in his small store, but does not know how to mark the areas to be monitored. Instead, he elects to upload the images his cameras are generating, to a cloud server. The images may then be marked automatically and/or, output of a pattern recognition engine e.g. semantic segmentation engine trained elsewhere (perhaps in other store/s, but not in John's store) may be reviewed, corrected and marked e.g. by humans, and the engine controlling John's system may then be modified accordingly. It is appreciated that the images generated at John's store may of course be stored remotely and used, in turn, to help modify other people's stores who may also subsequently elect to upload their images, just as John did.

The segmented images received from the predecessor cameras in the field may have been "functionally verified" hence typically have high accuracy and probability of segmentation. For example, segments labelled as "product shelves" in a retail store video analytics system may be "functionally verified" in a predecessor which has been functioning in the environment for some time, since products were detected on those shelves many times in the course of thousands (or more) of hours of video surveillance. Similarly, segments labelled as "road area" are "functionally verified" in a predecessor which has been functioning in the environment for some time, since the segmented area indeed was found many times to have cars passing over it; Similarly, segments labelled as "door" are "functionally verified" in a predecessor which has been functioning in the environment for some time, since the segmented area indeed was found many times to have people passing through it;

Operation 2: A a pattern recognition engine e.g. semantic segmentation tool or engine is trained for, say, semantic segmentation of the environment in which the newly installed video analytics system has been deployed, e.g. A Deep Convolutional Neural Networks (DNN). For example, the engine may be trained to recognize the new environment's product shelves (e.g. using the example of a retail store), and/or doors and passages (e.g. using the example of a family's domicile), using a predecessor's segmented images as a training set for the engine (e.g. some other retail store or domicile).

Images uploaded typically contain areas to be segmented and other areas, or objects to be recognized and background images. The background or other areas may be used as negative examples. For example, to train the engine to recognize doors, images of doors and images known not to be doors, may both be included in the training set.

Operation 3. According to certain embodiments, an object detector and tracker detects objects e.g. different products in the retail store which are segmented from background when loaded and when taken by customers. These objects are tracked with the image tracker, and the images acquired by tracking and or by segmentation may be used for training or tuning the object detector for detection of that particular product. Similarly, in a family domicile, detecting segmenting and tracking the people in the domicile thereby to generate images, facilitates face recognition training on the resulting images.

It is appreciated that this embodiment and other embodiments herein are more efficient for the end-user, relative to state of the art methods which require the system to train offline, and only later, for the pre-trained object detector to be put into operation.

Operation 4. The object detector trained in operation 3 may be further used to train other object detectors operative at other sites.

Figure 1:
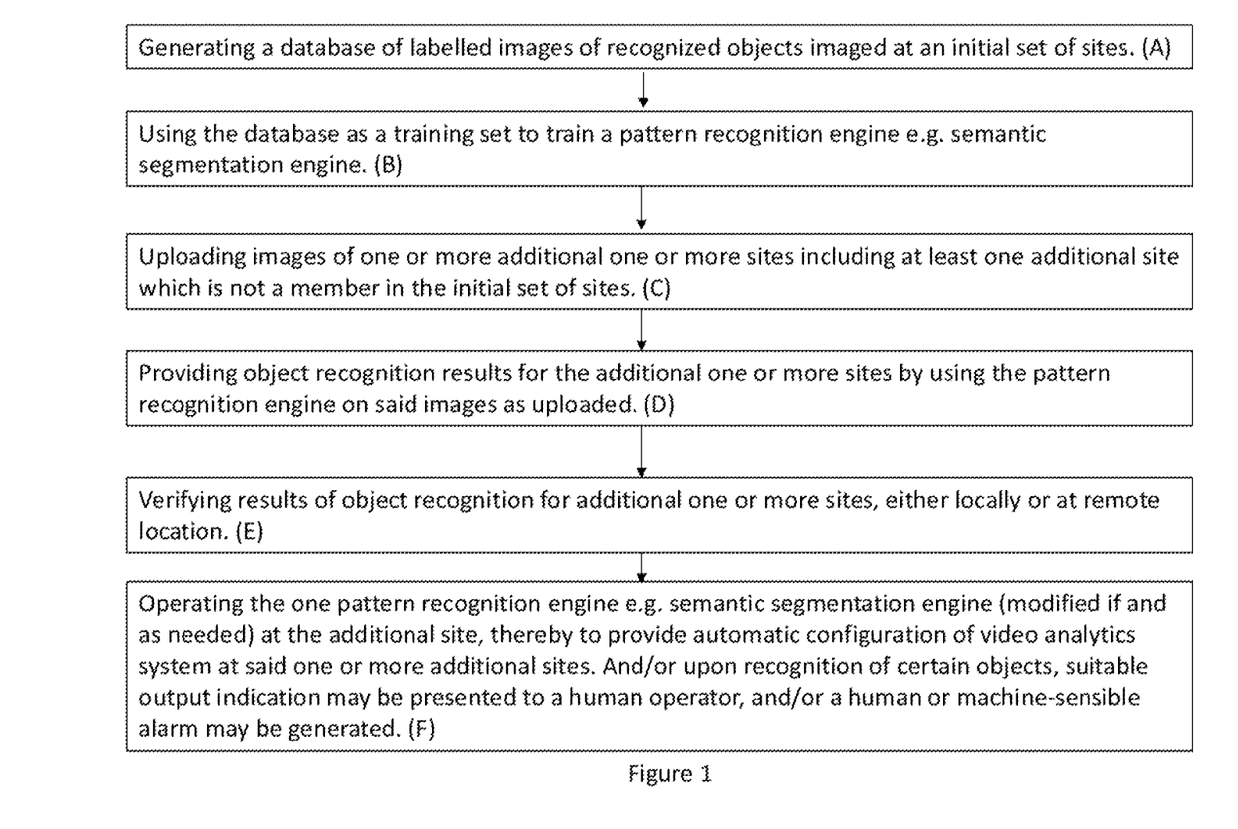
FIGS. 1 and 2 are simplified flowchart illustrations useful in understanding certain embodiments; methods and systems included in the scope of the present invention may include some (e.g. any suitable subset) or all of the functional blocks shown in the specifically illustrated implementations of FIGS. 1 and 2 by way of example, in any suitable order e.g. as shown.

FIG. 1 is a simplified flowchart illustration of a self-configuring video analytics method according to certain embodiments, all or any subset of the illustrated operations may be provided in any suitable order such as but not limited to the order particularly illustrated by way of example.

The method of FIG. 1 may be performed by a self-configuring video analytics system including a a pattern recognition engine e.g. a semantic segmentation engine which comprises a processor configured or programmed to segment acquired images into semantically significant areas and an object detection engine which comprises a processor configured or programmed to detect objects such as but not limited to: all humans, humans wearing specific uniforms or performing specific actions over a particular time period, all animals or just dogs, vehicles, portions of a structure such as doors or windows, specific types of objects, furniture, consumer products, vegetation; or labels, licenses, signs and other indicia. These engines are typically trained (e.g. learn) on extensive databases of ages in which areas are segmented and objects are labeled respectively.

As shown, the method of FIG. 1 typically includes the following operations:

A. Generating a database including labelled images of recognized objects imaged at an initial set of sites including at least one site. For example, the database may include labelled images of grocery products recognized at an initial set of grocery store sites including N grocery stores in one or several states or countries or geographical regions.

B. Using the database as a training set to train at least one pattern recognition engine e.g. semantic segmentation engine. For example, the engine may be operative to segment an image of grocery store shelves, each of which bear produce, into individual segments each comprising a single grocery product such as an apple or bottle or dried goods package. Optionally, each image is stored in association with a characterization of the site in which it was imaged such as "grocery store, Munich, Germany" or "hardware store, Florida". Optionally, plural a pattern recognition engine e.g. semantic segmentation engines are trained, and only a selected portion of the images in the database are used to train each engine. For example, two pattern recognition engines e.g. semantic segmentation engines may be trained for USA and Europe respectively. The first may be trained only on images generated in USA and the second may be trained only on images generated in Europe.

C. Uploading images of additional site/s including at least one additional site which is not a member in the initial set of sites. For example, John has just installed video analytics in his grocery store which happens to be in a geographical region other than the regions represented in the initial set of sites e.g. because John's store is in France, whereas none of the labelled images of grocery products in the database were imaged in France.

D. Providing object recognition results for the additional site/s by using the semantic segmentation engine on the images as uploaded. For example, object recognition functionality may be applied to images generated by John's video analytics, starting as soon as John has physically deployed his video analytics' imaging devices e.g. cameras in his store. John may for example be instructed to deploy cameras anywhere he likes so long as the full length and height of all shelves are included in the field of view of at least one camera. Or, Jane who is installing video analytics in her home, may be instructed to install one camera in each of the four ceiling corners, in each room in her home, and to adjust the orientation of each camera, say, to ensure that the entire opposite corner of the room is visible, from floor to ceiling, or any other easy to fulfill criterion.

E. Verifying results of object recognition for additional site/s, either locally or at a remote location. This may be done manually using a binary input mechanism e.g. to indicate that a particular object either is or is not recognized within a certain image or segment thereof. Or, this may be done automatically, e.g. by a server on a cloud which may have been trained using images provided by other end-users. The pattern recognition engine e.g. semantic segmentation engine may then be modified as needed. For example, at a central location or at John's store, a human oracle (or suitably configured software oracle which may be operative for communicating with John's video analytics e.g. via a suitable API) may be shown an image and an indication of an object recognized therein is presented e.g. simultaneously, along with an input option allowing the oracle to indicate whether or not the object recognition is correct. If, for example, an image of a bottle of oil is presented to an oracle for verification, typically along with a prompt or query such as: "is this a soft drink? Yes or no?" Then John or another oracle would indicate "no". That erroneous object recognition may have occurred because oil bottles in France greatly resemble soft drink bottles in other countries heavily represented in the database. If an image of a cottage cheese container is presented along with an indication such as: "is this cottage cheese? Yes or no?" Then John or another oracle would indicate "yes".

F. Operating the pattern recognition engine e.g. semantic segmentation engine (modified if and as needed) at the additional site, thereby to provide no-configuration object recognition video analytics at that additional site.

Upon recognition of certain objects, suitable output indication may be presented to a human operator, and/or a human- or machine-sensible alarm may be generated.

It is appreciated that the engine may "learn on the job" e.g. because the engine may be modified in accordance with oracle input. If, for example, an image of a bottle of oil, erroneously recognized as a soft drink, is presented to an oracle for verification along with an indication such as: "is this a soft drink? Yes or no?" and John or another human or automated oracle indicate "no" then the engine is typically tuned accordingly.

More generally, object detectors typically comprise computer algorithms that upon receiving an input image, provide output including bounding boxes around detected objects, a previously learned classification of each detected object e.g. "soft drink" and, typically the level of confidence in the detection.

Semantic segmentation engines typically comprise computer algorithms that receive an input image and provide a segmented or partitioned linage defining plural regions or areas, each bearing a label designating that region as belonging to a particular object or background type.

State of the art object recognizer, object detector and semantic segmentation engines may be implemented as Deep Neural Networks, configured e.g. trained on large training datasets which may include thousands, tens of thousands or millions or more of 'ground truth' images, which have objects or areas marked therewithin.

For example, in order to train a detector to find bottles of soft drink in images, many thousands of the images containing, say, different types of soft drink bottles, imaged from different angles and distances, in different orientations and locations, with different backgrounds and illumination conditions may be employed. Or, training a pattern recognition engine e.g. semantic segmentation engine to identify product shelves areas in images may include presenting thousands or millions of different images with product shelf areas of various kinds, imaged at various conditions.

During training the weights (internal parameters of DNN's) may be tuned to cause the DNN to correctly predict the labeled objects or areas in the training sets. Dnn's are then capable of generalization e.g. the ability to detect objects (or segment areas) on input images not included in the training set. The architecture of the DNN, and the training procedure, are typically each selected, as known in the art, to achieve optimal performance on the test sets in the real systems.

According to certain embodiments, scene and environment identification is provided via training of a pattern recognition engine, such as multilayer neural networks on the scenes and classified environments. All cameras installed in the city periodically upload acquired images to the server, and these images are marked 'city environment. Smart city configuration'. All cameras installed in the parking lots may upload their images marked 'parking lot'. Similarly, cameras may be installed in other environments, conditional upon prior agreement with the user and ensuring user privacy by secure transfer and storage and/or by digital anonymizing of people's identities or other sensitive content.

In such cases, the possibilities provided by the DNN (deep neural network) may be presented to the user, with ranking corresponding to DNN decreasing confidence levels, and with the most probable case selected e.g. by default.

According to certain embodiments, the environment of each additional site is partitioned, e.g. as part of camera installation and before FIG. 1's operation c (uploading images) is performed. For example, by finding joint overlapping regions with other cameras, mutual alignment of cameras may be performed. If the regions do not overlap, then detect and track objects which are exiting one camera's field of view and entering the field of view of another camera, typically estimating their speed and delay between the exit from the first camera and arrival in the field of view of the second camera, computing an estimated distance between cameras based on the product of the speed and delay, and averaging the estimated distance over plural objects moving along different trajectories between the two cameras.

By semantic segmentation of the image: regions such as car roads, pedestrian walk-ways, grass gardens in the street, parking lots and road signs, in the parking lots, city infrastructure (chairs, traffic signs and lights, buildings and their elements, trees, fences, parks) which helps to increase the resolution of the fine-detail image partitioning.

Semantic segmentation algorithms (or object recognition or detection algorithms) may be performed by Convolutional Neural Networks, which are trained on the databases for the particular environments. The databases are provided by the cameras installed in the target environments, manually segmented.

The partitioning e.g. into non-overlapping regions that entirely cover the image, may for example be performed by any or all of the following, separately or in combination:

1. Image segmentation based on texture and/or color, initially, which is usually insufficient, but yields an initial probability density, and may be combined with other methods.

2. Object detection by pattern recognition engine, such as Support Vector Machines or Deep Learning algorithms may be used as an input for further object localization and segmentation.

Typically, Object detector functionality finds a pre-defined object (such as doors, product shelves, cashier machines, product carts, products, humans), in an input image, in any suitable manner. For example, Object detectors may be trained on training sets including, say, thousands to millions of images, in which certain objects are labelled and the borders thereof are marked. Object detectors may comprise multilayered neural networks, typically including a first layer which receives values of image pixels, and a last layer, which, after training, produces values encoding the detected objects and their positions within the input image. Typically, each layer N includes neurons which obtain weighted values from at least some of the neurons from layer N−1, multiplies each of the weighted values by certain weight, sums over these weighted layers, and transforms the result through a non-linear function f(x−S) with S as an adaptable threshold:

$$W(N,i) = f(\text{sum}(W\_k * W(N-1,k)) - S\_N\_i);$$

Where the weights W_(N−1,k) and the thresholds S_N_i are adapted to bring the networks response over the training sets as close to the training set labels as possible.

3. Apply semantic segmentation (e.g.) algorithm or engine trained for a particular environment. For example, stored engines may be associated in memory with a manually or automatically entered indication identifying each engine as suited for one of the following: stores, domiciles, parking lots, street monitoring, shopping centers.

4. Perform object detection on the images, e.g. using detection validation, and improve the semantic segmentation. For example, a detected door in an apartment is part of the walk-path, and is itself a semantic object (area). Human and face detection and recognition in the door area may be performed in a manner which utilizes the knowledge that this is a door area, thereby enabling the detector to be tuned more accurately, since a door allows certain safe assumptions to be made regarding the scale and/or position and/or direction of motion and/or type of objects e.g. humans adjacent thereto. For example, adult human height (roughly 150-190 cm), may be assumed to be a certain ratio of the door height (typically 200 cm height for office doors), direction of the human's motion may be assumed to be 1 of 2 possibilities: either coming into or leaving through the door. body position e.g. relative orientation of body parts is also known since humans normally walk through a door and do not sit or lie down. All these assumptions are useful in in performing various detection tasks e.g. is a human present or absent, as well as recognition tasks (e.g. what particular person is present—is this Dad, Mom or Sally) as well as reducing the proportion of false alarms (e.g. an object recognized as a human may be discounted as a false detection if its orientation or body size deviates from assumptions regarding the orientation and body size of humans in the vicinity of doors e.g. as described above.

5. Functional validation: By detection and tracking of semantically segmented images (or of detected or recognized objects), the segmentation, detection or recognition may be verified e.g. if tracking reveals that an object is being used as a pathway for recognized humans, then indeed the object is a door and not a window, mirror or wall mural. For example, a labeled database may be generated which includes millions of images uploaded from many thousands of cameras, installed in stores, in these images the regions of putative product shelves, entrances, cashing registers, have been segmented and tagged, say by automatic labelling and/or verified and/or labelled manually by human experts. Alternatively or in addition to human expert verification, the regions may be verified or validated functionally over time. For example, yes, this is a product shelf because "product" objects, such as soft drinks or vegetables, are detected on the product shelves and/or because objects (products) are removed from the putative product shelf by putative customers and renewed by putative staff, thereby functionally validating all objects involved namely in this case, the shelves, the products, the customers and the staff.

It is appreciated that a very wide range of use-cases are possible fir automatically configured video analytics e.g. as shown and described herein; the following use-cases are described merely by way of example:

1. Private Residential Apartment or Home or Domicile; or Place of Business.

The cameras may trigger an intrusion/fire/medical emergency alarm and/or may help in searching for certain objects including persons e.g. faces or voices thereof (in which case cameras may be replaced or augmented by suitably deployed microphone/s), and/or may set reminders and control activities of family members accordingly such as taking prescribed medications by elders, school home-work by children, walking the dog, exercise programs, household chores to be performed by family members etc.

Automatic configuration e.g. As described herein may for example be applied to facilitate acquisition of family members' faces or voices as opposed to frequent guests and alarming new-comers e.g. To issue reminders to family members only or to alert regarding presence of newcomers.

Automatic configuration e.g. As described herein may for example be applied to facilitate acquisition of entrance doors and windows which may be desired to be outlined e.g. For intruder detection, and so on.

Object recognition may be used to allow the camera to recognize and outline doors and/or windows; and/or object tracking and/or on-line learning to learn and recognize family members and later distinguish them. High level behavior analysis, based on time patterns, motion patterns, social interactions, may be used to support recognition of suspicious activities and/or medical emergencies.

To be configured: 1-5 cameras, located on the door, hall, living rooms and optionally other locations within the house.

Basis for semantic segmentation and/or for object recognition or detection may for example include:

A. Via object and subject recognition: Family members, casual home furniture such as sofas, TV sets, carpets, windows, dinner table, kitchen, kitchen furniture, dishes, home bathrooms.

And/or

B. Via temporal patterns: children return in the afternoon after school and kindergarden; adults return home in the evening after work. Both typically sleep in the house rather than being absent overnight, and leave the house in the morning. There may also be weekly patterns, if over the weekend people normally stay at home rather than go to school or work, or go out at times different from habitual week-day times, and/or with different clothes, equipment, patterns (e.g. all family members leaving at the same time, rather than separately in a staggered pattern).

Functions may include some or all of: Intruder detection; Fire alarm; Medical emergency detection; Pet control and monitoring.

2. Retail Store Environment

Video Assistance system may be configured for all or any subset of: analysis of customer preferences, statistics regarding customer time spent at different areas of the store, glancing at certain shelves, theft detection systems, statistics on customers' age, sex, clothing styles and buying habits.

The mounted camera will:

1. Automatically define an observed area (e.g. entrance, shelves, cashier region, fitting rooms; etc.

and/or 2. detect overlapping fields of view between cameras deployed in the store, or other geometric relationships between cameras, from which a map of the environment may be derived for any suitable use e.g. for tracking and analysis.

To be configured: 2-10 cameras, observing the cashier area, storage area, shelves, and entrances.

Basis for semantic segmentation and/or for object recognition may for example include:

Store shelves, cashiers may be well recognized patterns for the video analytics systems, as opposed to customers, who may include multiple (hundreds or more) different individuals, many appearing only once or infrequently e.g. once in a few weeks or days. Most of the objects are articles for sale, which may for example be recognized, at least initially, by virtue of the regular or orderly repetition of multiple instances of the same article (many tomatoes in the tomato bin, many boxes of cornflakes on the bottom shelf).

Functions: all or any subset of: ordering produce and account for the inventory, detection of misplaced inventory, account for expiry date and storing times, shoplifters, proof of purchase for customers.

Figure 2:
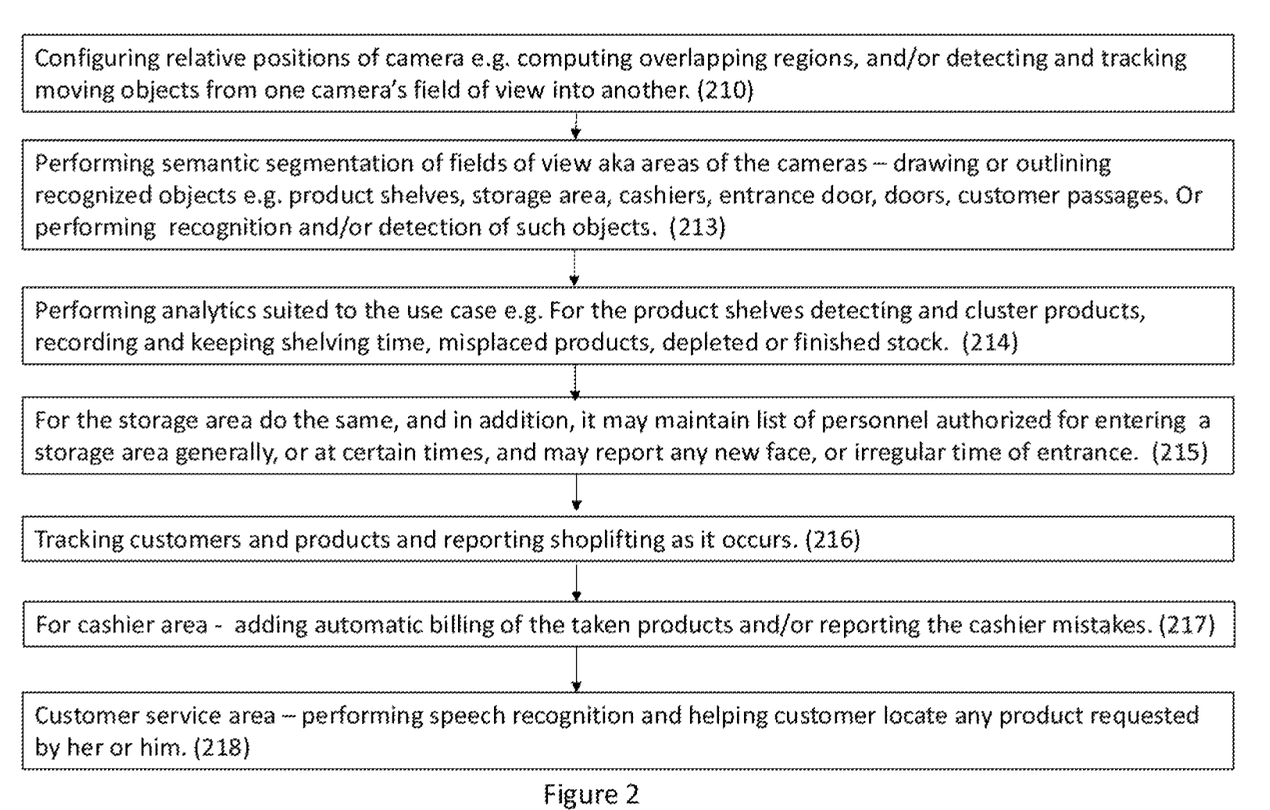

FIG. 2 is a simplified flowchart illustration of a video analytics method suitable for brick-and-mortar stores. The method of FIG. 2 typically includes all or any subset of the following operations, suitably ordered e.g. as shown:

210. Configure relative positions of cameras e.g. by computing overlapping regions, and/or detection and tracking moving objects from one camera's field of view into another, e.g. for disjoint regions.

For overlapping regions (observed by 2 or more cameras) the 3D shape of the region may be extracted from a stereo pair of 2 observing cameras via a suitable solution of the stereo matching problem.

Figure 3:
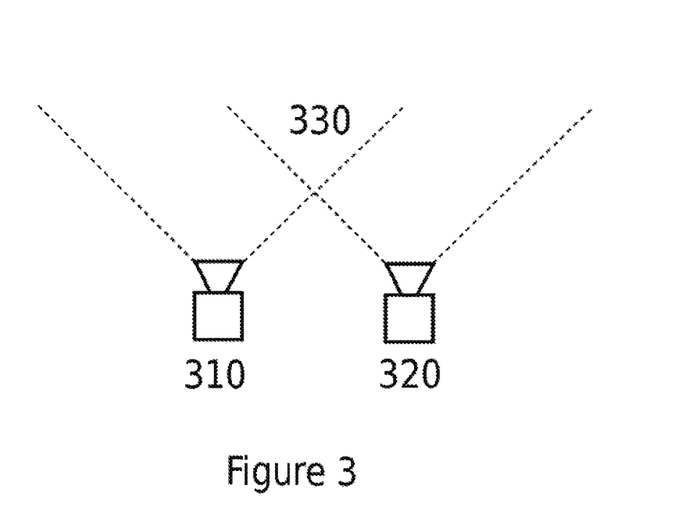
FIGS. 3 and 4 are simplified pictorial illustrations useful in understanding certain embodiments.

For example, FIG. 3 illustrates cameras 310 and 320 deployed in a single physical facility and having fields of view which overlap, thereby to define a common region 330. By comparing the orientations and/or positions and/or sizes of objects in region 330, camera 310 may deduce its own position relative to camera 320 and vice versa.

Figure 4:
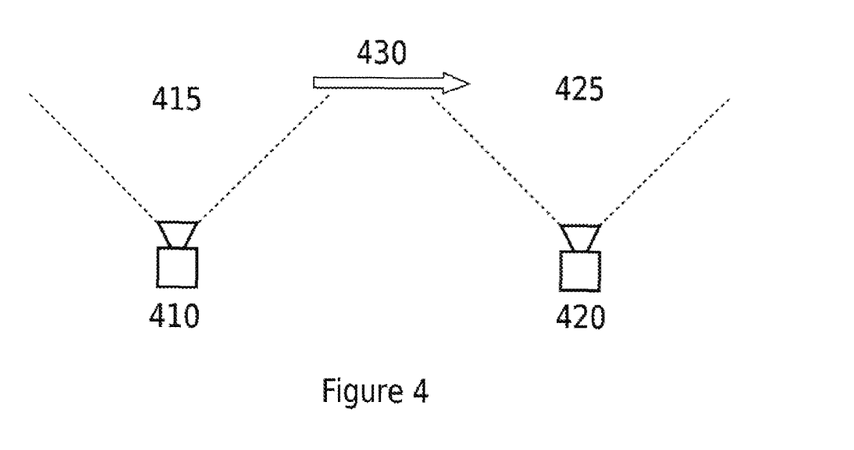

FIG. 4, in contrast, shows cameras 410 and 420 having non-overlapping fields of view 415 and 425. In this case, the cameras may each wait for an object to move from one camera's field of view to the other's, e.g. as shown by arrow 430. This may be detected by camera 410 as an object that moves out of its field of view. Camera 410 may then poll other cameras that camera 410 is aware of in the same facility e.g. Camera 420 in accordance with a suitable predetermined protocol, to determine whether an object has entered their field of view and if so whether that object corresponds in appearance to the object that has just exited camera 410's field of view.

Any suitable technology may be employed to allow each camera (e.g. 410) or the camera's controls e.g. controlling server, to become aware of other cameras (e.g. camera 420's) deployment within the same facility. Inter alia, suitable camera connection technology may be provided. For example, one or more surveillance cameras may be wi-fi enabled and may during installation be connected to a local wi-fi network, and may relay their captured video stream over the wi-fi network toward at least one dedicated, local or remote, physical or virtual (e.g. cloud-configured) server operative for collecting all video streams from all cameras deployed in a given facility. The server may also be operative for processing the streams, and may be operative for redirecting the streams towards a corresponding user computer.

During initialization stage, the camera may connect to the local wi-fi network, using the name and password of the network as known to the camera, which typically also knows the credentials of its owner who is associated with a corresponding user account on the server. The information e.g. credentials may be communicated e.g. by the camera towards the server, and responsively, the server may direct the video streams towards the corresponding user e.g. to a video analytics application residing on the user's computer.

To reduce the camera's bill of materials of the camera and/or to simplify the user interface, the camera may not be equipped with mechanical keys via which to enter network and/or user account credentials. Instead, this functionality may be provided solely by relying on the camera's video acquisition and processing abilities. the credentials may be submitted to the camera as a visual pattern, e.g. QR code or bar code in which the credentials have been suitably encoded.

The code e.g. QR code can be presented, for example, from the user's smartphone screen.

Once the server has established connections with the user cameras e.g. as above, the server knows how many cameras are operating for each specific user who has an account, and knows any other relevant information relayed by that user's cameras.

Typically, each User has a dedicated application e.g. a cell app to be downloaded onto her or his smartphone. This application typically prompts the user to provide some or all of: her or his account's login/password as stored on the server, wi-fi name and/or password, application/system type. The cell app then encodes this information visually e.g. to QR code and displays the resulting code to the camera.

Once the user has connected to the server and his application has requested the video-streams from the relevant cameras, the user receives these from the server typically in conjunction with camera related information, and/or results of corresponding on-server (on-cloud) processing.

Typically, at least one computer is deployed either locally or on a cloud and is operative for receiving and merging information from all cameras, say cameras 410 and 420 in the present example. This computer may also be operative inter alia to store information regarding mutual position between the cameras if available, or stores a 'relation unknown' tag until that information becomes available.

That relative position between any pair of cameras may for example be represented as a Fundamental Matrix, which relates two images of the same point acquired by two cameras. Fundamental matrices are described, inter alia, in *Multiple View Geometry*, Richard Hartley and Andrew Zisserman, Cambridge University Press 2004.

For cameras with overlapping fields of view, known in the art methods may be employed to compute the fundamental matrix from corresponding points within the images acquired from both cameras. Corresponding points e.g. point x1 on an image acquired by the first camera, and x2 on an image acquired on the second camera, both corresponding to a single point location X in 3D space), may be detected using any suitable method known in the art, such as but not limited to object recognition and/or local matching, image registration, e.g. as described in the above-referenced [Hartley 2004] reference.

For example, camera 410 may recognize the object, e.g. may recognize that the object is a human whose face is known, e.g. Mom. In this case, camera 410 may poll other cameras to determine whether Mom has just entered their field of view. If so, this event may be utilized to determine the mutual configuration e.g. relative positioning of cameras 410, 420. For example, the distance between the cameras may be determined by computing Mom's speed within each camera's field of view, estimating Mom's speed in proceeding from one field of view to the other e.g. by interpolation, and determining distance between the fields of view accordingly, and based on the time interval that elapsed from when Mom disappeared from one camera's field of view and appeared in the next camera's field of view. The relative orientation may be re-computed for other objects found to be travelling from one camera's field of view to another, thereby to verify and improve knowledge of the relative orientation.

The same method may even be used for overlapping cameras as in FIG. 3, e.g. If there is insufficient content e.g. none or not enough edges or objects in overlapping region 330, to allow the overlapping cameras to determine their mutual positions.

213. Perform semantic segmentation of fields of view, aka areas of, the cameras—draw or outline recognized product shelves, storage area, cashiers, entrance door, doors, customer passages.

214. For the product shelves detect and cluster products, record and keep shelving time, misplaced products, depleted or finished stock.

215. For the storage area do the same, and in addition, it may maintain list of personnel authorized for entering a storage area generally, or at certain times, and may report any new face, or irregular time of entrance.

216. Track customers and products, report shoplifting.

217. For cashier area: add automatic billing of the taken products and/or report the cashier mistakes.

218: Customer service area—speech recognition and help customer locate any product requested by her or him.

3. Parking Lot.

To be configured: 5-30 cameras or more.

Basis for semantic segmentation and/or for object recognition or detection may for example include:

Open space (illumination and exposure level), multiple cars, mostly still, densely in the regular pattern.

Functions: may include all or any subset of: Billing of cars according to the parking time; management of the free parking lots, re-direction of cars toward free lots; management of car security (ok if driver who parked a car subsequently re-approaches the same car, but persons other than the original driver approaching that parked car may trigger a warning), help driver find his car (recognition of driver (e.g. her face or voice), and telling her or him the car location previously stored in association with that same "object" (e.g. face/voice).

4. Mall

A self-configuring shopping center video analytics system is now described by way of example.

Multiple surveillance cameras may be deployed throughout the shopping center, surveying the scene. Automatic configuration may include automatically configuring the cameras via object recognition including all or any subset of:

Doors—where customers enter and exit (appear and disappear), where recognition of door area is used to configure the area where the shop-lifting alarm is to be triggered. Door area, once recognized, may also be used to detect a new entering customer and, depending on her or his observed characteristics, e.g. age and gender, direct customer to certain areas e.g. produce suitable for men vs. women or children vs. adults, or evaluate the customer's dress style, and suggest dress items in the dress store accordingly.

Cash registers—to facilitate or supervise transactions, correct mistakes.

Semantic segmentation of areas e.g. those described above, may be performed, and/or learning of mutual geometric relationships between the cameras e.g. by detection and matching of overlapping areas, visible simultaneously in at least two cameras; and/or by tracking objects visible simultaneously or sequentially (first the object is observed by camera A, and then, by camera B, after a certain delay, allowing the spatial relationship between cameras A and B to be determined depending on the object's speed, direction, offset by certain randomness of object speed and direction in the obscured part of their trajectory.

During installation, users may be prompted to indicate which cameras are in the vicinity of each other, which may help determine the mutual positions of the cameras. Cameras identified by a user as neighbor cameras will be checked first and more thoroughly for overlapping areas, and for tracking of the same objects.

System goals may include some or all of:

Detecting shopping center inefficiency: dirty areas that need cleaning, empty shelves that need to be refilled with produce, inefficiencies in business, customer flow, malfunctions of equipment;

Detecting fire/violence or medical emergencies;

Detecting shoplifters and intruders

Even immediately after installation in the shopping center, captured image files may be uploaded to the cloud for automatic segmentation, and verified and corrected e.g. by human experts, and used e.g. centrally, by being retained in the database for training of additional automatic segmentation engines e.g. in other shopping centers.

Objects including humans may be detected and tracked by human detection and tracking engines, and some of the frames/videos may be verified by experts, and used for further training of object e.g. human recognition/tracking engines.

Detected humans may be classified in different subgroups depending on their appearance and/or motion patterns:

For example, employees wearing a special uniform may be included in an employee sub-group, and their areas and times of activity may be determined. Any employee in uniform moving in a non-typical area and/or non-typical time may be detected and brought to the attention of a human supervisor, and/or recorded in a video-summary, and/or forwarded for further detailed analysis.

Similarly, habitual areas and/or times of activity of customers and other groups of employees may be recorded and summarized and outliers may be detected by abnormal areas, times, appearance and motion patterns. Outliers, whose behavior is not habitual, may be analyzed in-depth, (e.g. all motions of the person whose motion/behavior pattern was recognized as an outlier, may be recovered and further analyzed), presented to a human operator, or may generate a certain alarm.

Another example functionality is detecting litter accumulation in a certain area and triggering an alarm to a human or automatic cleaner that it's time to clean that area. Papers for example may be recognized as litter, whereas a pocketbook or anything that is actually part of the design of the floor tiles, is not litter. If a pocketbook or anything that is actually part of the design of the floor tiles is erroneously recognized as litter, this may be corrected at the verification stage of the method of FIG. 1.

Still another example functionality is detecting license plates e.g. on toll roads. An object recognition engine may be trained in one country, perhaps in a country in which license plates are relatively easy to recognize, and then improved, using the method of FIG. 1, during deployment of the object recognition engine in another country. For example, it is known that European license plates, characterized by alpha-numerical symbols in black on white background, are easy to recognize, whereas United States license plates have many colors and fonts and shapes and include so-called customized license plates. An object recognition engine may be trained on license plates imaged in a European country, and then improved, using the method of FIG. 1, during deployment of the object recognition engine in another European country or American state. Even more difficult are Far Eastern license plates known to include many different symbols and fonts. Yet an object recognition engine may still be effectively deployed in a Far Eastern country, perhaps after first being trained on license plates imaged in an "easy" e.g. European country, and then improved, using the method of FIG. 1, during deployment of the object recognition engine in another "easy" country e.g. another European country and/or subsequently improved again during deployment in a more "difficult" country such as the USA or/and eventually, during deployment in a very "difficult" country, such as Japan or China.

It is appreciated that any or all functionalities shown and described herein may be provided by on-cloud processing rather than locally, thereby to provide an on-cloud solution to all or any subset of the functionalities shown and described herein.

It is appreciated that terminology such as "mandatory", "required", "need" and "must" refer to implementation choices made within the context of a particular implementation or application described herewithin for clarity and are not intended to be limiting, since in an alternative implantation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices, such as smartphones, may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including operations, which are described for brevity in the context of a single embodiment or in a certain order may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, homepna, power line communication, cell phone, Smart Phone (e.g. I-phone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A computerized method for simplifying an installation of a video analytics system in an environment, the method comprising:
   generating a database of labelled images of recognized objects,
   wherein the images were imaged at an initial set of sites and
   wherein the set of sites includes at least one site;
   using the database as a training set to train a pattern recognition engine;
   uploading images of additional one or more sites including at least one additional site which is not a member in the initial set of sites;
   providing object recognition results for the additional one or more sites by using the pattern recognition engine on said images as uploaded;
   verifying said object recognition results; and
   using a processor for operating the pattern recognition engine on images generated at each said additional one or more sites including modifying the pattern recognition engine at the additional one or more sites accordingly and when indicated by said verifying, thereby to provide automatic configuration of video analytics system's camera at said additional one or more sites including accommodating unique characteristics of each of the one or more sites,
   wherein said pattern recognition engine is trained to identify a type of said environment, and
   wherein the method further selects at least one video analytics application that is suitable for the identified environment.

2. A method according to claim 1, wherein said verifying is performed remotely from the additional one or more sites.

3. A method according to claim 1 wherein said verifying comprises presenting said object recognition results to a human and accepting a verifying input provided by the human.

4. A method according to claim 3, wherein said accepting comprises displaying two selectable options to the human, corresponding to "object" and "not object" and accepting an option that the human selected out of one of the two options.

5. A computerized system for simplifying an installation of a video analytics system in an environment, the system comprising:
   a database including labelled images of objects recognized at an initial set of sites including at least one site;
   a user interface for accepting uploaded images of additional one or more sites including at least one additional site which is not a member in an initial set of sites wherein the uploaded images are stored in said database; and
   a processor configured for:
      (i) using said database as a training set to train a pattern recognition engine;

(ii) providing object recognition results for the additional one or more sites by using a pattern recognition engine on said images as uploaded wherein said pattern recognition engine is in data communication with said processor;
(iii) verifying said object recognition results;
(iv) operating the pattern recognition engine on images generated at each said additional one or more sites including modifying the pattern recognition engine accordingly; and
(v) automating configuration of said video analytics system's camera at said additional one or more sites including accommodating unique characteristics of each of the one or more sites, based on said verifying,
wherein said pattern recognition engine is trained to identify a type of said environment, and
wherein the processor is further selecting at least one video analytics application that is suitable for the identified environment.

6. A computer program product, comprising a non-transitory tangible computer readable medium having computer readable program code embodied therein, said computer readable program code adapted to be executed to implement a computerized method for simplifying an installation of video analytics system in an environment, the method comprising:
generating a database and including labelled images of recognized objects imaged at an initial set of sites including at least one site;
using the database as a training set to train a pattern recognition engine;
uploading images of additional one or more sites including at least one additional site which is not a member in the initial set of sites, wherein the uploaded images are stored in said database;
providing object recognition results for the additional one or more sites by using the pattern recognition engine on said images as uploaded;
verifying said object recognition results; and
using a processor for operating the pattern recognition engine on images generated at each said additional one or more sites including modifying the pattern recognition engine according to and when indicated by said verifying, thereby to automate configuration of video analytics system's camera at said additional one or more sites, including accommodating unique characteristics of each of the one or more sites, based on said verifying,
wherein said pattern recognition engine is trained to identify a type of said environment, and
wherein the method further selects at least one video analytics application that is suitable for the identified environment.

7. A system according to claim 5 and wherein said pattern recognition engine comprises a semantic segmentation engine.

8. A system according to claim 5 and wherein said pattern recognition engine comprises an object detection engine.

9. A system according to claim 5 and wherein said pattern recognition engine comprises an object recognition engine.

10. A method according to claim 1, wherein the method further configures at least one selected video analytics application that is suitable for the identified environment.

11. A method according to claim 1, wherein said pattern recognition engine is trained to classify a type of said environment.

12. A method according to claim 1, wherein said providing of object recognition results includes installment and deployment of the one or more cameras for the additional one or more sites.

13. A method according to claim 1, wherein said verifying, of said object recognition results, is performed automatically by a server.

* * * * *